United States Patent
Kritt et al.

(10) Patent No.: US 8,103,648 B2
(45) Date of Patent: Jan. 24, 2012

(54) PERFORMING SEARCHES FOR A SELECTED TEXT

(75) Inventors: Barry Alan Kritt, Raleigh, NC (US); Thomas S. Mazzeo, Durham, NC (US); Rodney Edward Shepard, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 11/870,711

(22) Filed: Oct. 11, 2007

(65) Prior Publication Data

US 2009/0100016 A1    Apr. 16, 2009

(51) Int. Cl.
 *F06F 17/30* (2006.01)
(52) U.S. Cl. ......................... 707/706; 707/709
(58) Field of Classification Search ............. 707/2, 3, 707/5, 999.001–999.005, 705, 706, 709, 707/999.01
See application file for complete search history.

(56) References Cited

U.S. PATENT DOCUMENTS

| | | | |
|---|---|---|---|
| 6,691,111 B2 | 2/2004 | Lazaridis et al. | |
| 7,050,977 B1 | 5/2006 | Bennett | |
| 7,092,934 B1 * | 8/2006 | Mahan et al. | 1/1 |
| 7,110,829 B2 | 9/2006 | Cunningham et al. | |
| 7,185,272 B2 * | 2/2007 | Pearce et al. | 715/207 |
| 7,689,613 B2 * | 3/2010 | Candelore | 707/707 |
| 2006/0190441 A1 | 8/2006 | Gross et al. | |
| 2006/0200455 A1 | 9/2006 | Wilson | |

OTHER PUBLICATIONS

Perez, "Web Search Agents: One-Stop Shopping for Researchers" Online (Journal) vol. 26, No. 2-3,Mar.-Apr. 2002, pp. 20-25.
Zang et al., "MetaFinder: A Meta-Search Engine with an Open Architecture", Proceedings of the ISCA 20th International Conference—Computers and Their Applications, Louisiana, Mar. 16-18, 2005, pp. 80-85.

* cited by examiner

*Primary Examiner* — Apu Mofiz
*Assistant Examiner* — Monica Pyo
(74) *Attorney, Agent, or Firm* — Yee & Associates, P.C.; Steven L. Bennett

(57) ABSTRACT

A computer implemented method, apparatus, and computer usable program code for performing a plurality of searches. A request is received to perform the plurality of searches, wherein the request includes text. A search engine preference is retrieved, wherein the search engine preference specifies a plurality of search engines. An Internet browser is opened for each search engine in the plurality of search engines. A search is initiated in each Internet browser using the text.

17 Claims, 4 Drawing Sheets

PERFORMING SEARCHES FOR A SELECTED TEXT

BACKGROUND OF THE INVENTION

1. Field of the Invention

The present invention relates generally to data processing systems and in particular to search engines. Still more particularly, the present invention relates to a computer implemented method, apparatus, and computer usable program code for performing a plurality of searches for a selected text.

2. Description of the Related Art

Often, a user viewing a document wishes to search for a portion of text from the document using two or more search engines. The user opens an Internet browser for each search engine the user wishes to use to perform the search and navigates these browsers to a different, preferred search engine. The user copies and pastes the text from the document into each search engine and directs each search engine to perform a search using the text.

For example, a consumer may perform two or more searches to compare prices for an upcoming electronics purchase by searching the websites of several electronic retailers, such as websites for Amazon.com Inc. and Best Buy Co., Inc. Navigating to several different search pages for these search engines, copying and pasting text into the search pages, and requesting the search for each search page is time consuming and repetitive for the user.

BRIEF SUMMARY OF THE INVENTION

The illustrative embodiments described herein provide a computer implemented method, apparatus, and computer program product for performing a plurality of searches. A request is received to perform the plurality of searches, wherein the request includes text. A search engine preference is retrieved, wherein the search engine preference specifies a plurality of search engines. An Internet browser is opened for each search engine in the plurality of search engines. A search is initiated in each Internet browser using the text.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
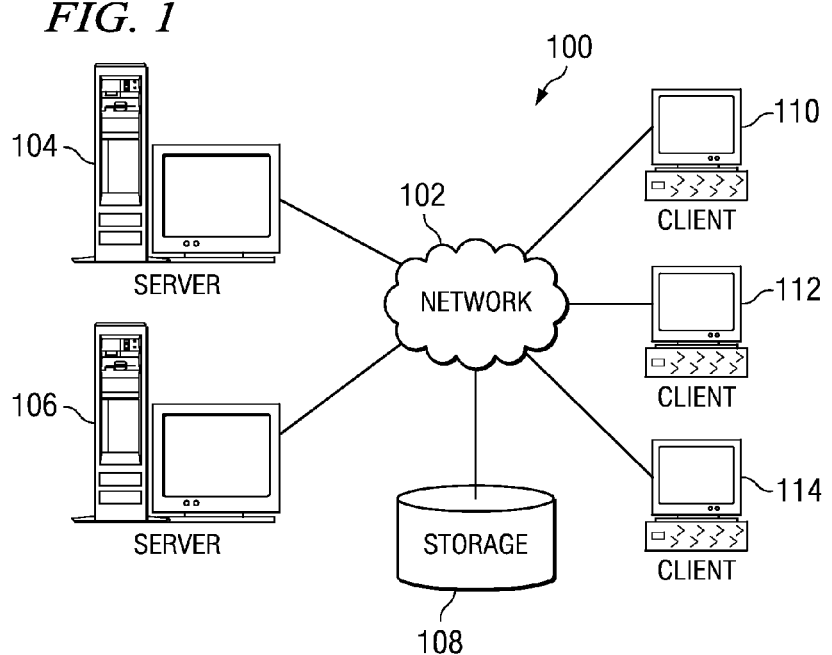
FIG. 1 depicts a pictorial representation of a network of data processing systems in accordance with an illustrative embodiment.
Figure 2:
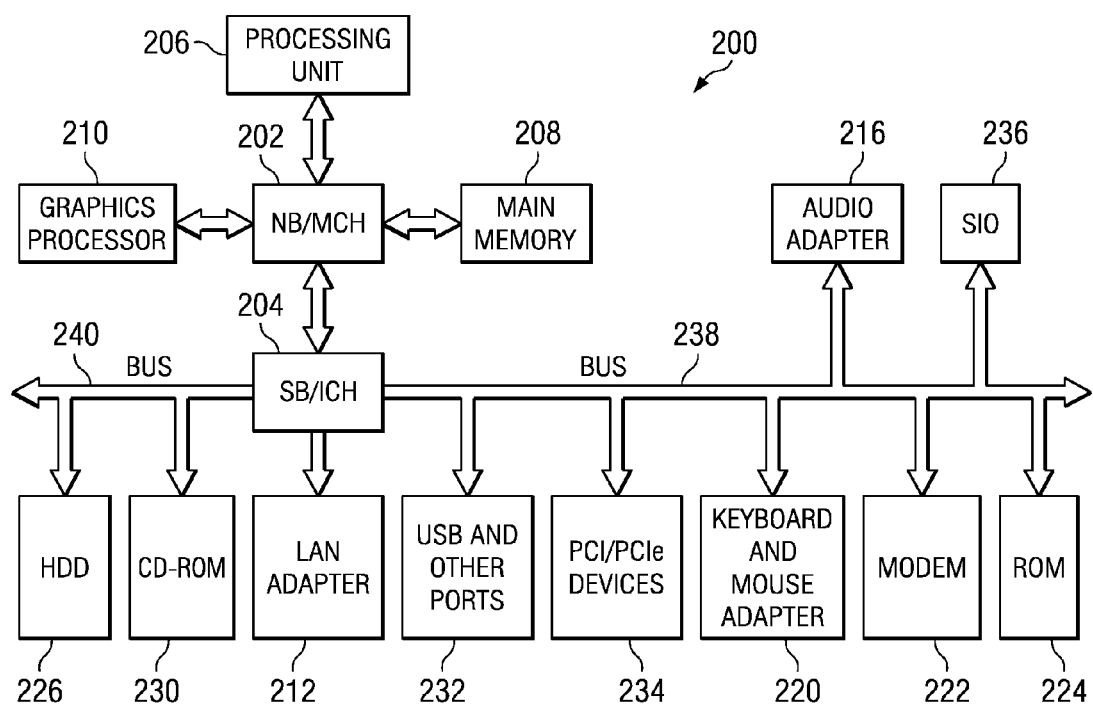
FIG. 2 is a block diagram of a data processing system in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. Servers 104-106 may host search engines for searching websites on network 102. Clients 110-114 may initiate searches with those search engines with processes in the different illustrative embodiments.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
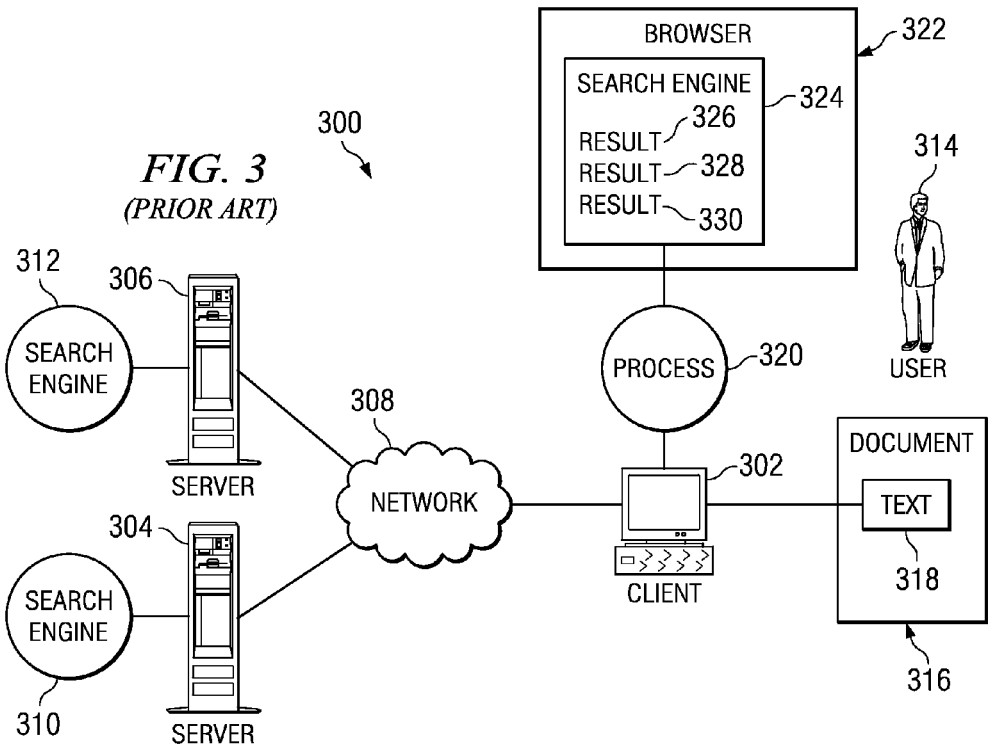
FIG. 3 is a block diagram of a network with search engines in accordance with an illustrative embodiment.

FIG. 3 is a block diagram of a network with search engines in accordance with the prior art. In network with search engines 300, client 302, server 304, and server 306 are connected to network 308. Client 302 is a client, such as client 110 in FIG. 1, and servers 304 and 306 are servers, such as servers 104 and 106 in FIG. 1. In this example, server 304 hosts search engine 310, and server 306 hosts search engine 312. Search engines 310 and 312 are found at websites on the Internet where a user may conduct a search of the website, or of the Internet. For example, search engines 310 and 312 may be websites in which a search engine is provided for searching data within the website. Search engines 310 and 312 may be search engine widgets, such as Blogbar or Blingo, that can be implemented as part of the website. Alternately, search engines 310 and 312 may be websites used for searching the Internet, such as the websites for Google.com and Ask.com.

User 314 views document 316 on client 302. User 314 encounters text 318 in document 316. Text 318 may be any amount of a written language, such as a single word, a phrase, a sentence, or several sentences. Typically, if user 314 wants to find more information about text 318, user 314 starts process 320. Process 320 displays browser 322. Browser 322 is an Internet browser for surfing the Internet. User 314 directs browser 322 to search engine 324, highlights text 318, copies and pastes text 318 from document 316 to browser 322, and requests search engine 324 to perform a search using text 318. Search engine 324 is the website of a search engine, such as search engines 310 and 312.

After search engine 324 receives the request to search using text 318, search engine 324 displays the results of the search, such as result 326, result 328, and result 330 in these examples. Results 326-330 may each contain a hyperlink to a website matching text 318, or results 326-330 may indicate that text 318 was not found and suggest alternate search words. In this example, a search on text 318 by search engine 324 results in three results, results 326-330. Those versed in the art will appreciate that results 326-330 may be more than three or fewer than three, depending on how many instances of text 318 are found by search engine 324.

If user 314 wishes to search for text 318 using several different search engines, then user 314 navigates browser 322 to search engine 324 corresponding to each one of the different search engines, copies and pastes text 318 into search engine 324, and requests search engine 324 to perform a search using text 318. For example, a medical student might perform searches to find the meaning of a medical term on several medical information websites, such as the websites for Web MD, Dr. Koop, and the Mayo Clinic. Alternately, the medical student may perform searches to compare prices for an upcoming television purchase by searching the websites of several electronic retailers.

The different embodiments recognize that navigating to several different search pages, copying and pasting text, and requesting the search for each search page as required by the prior art is time consuming and repetitive for a user. The illustrative embodiments recognize a need for a way of quickly and easily performing the search for a text using more than one preferred search engine for a particular text.

Thus, the illustrative embodiments described herein provide a computer implemented method, apparatus, and computer usable program code for performing a plurality of searches. A request is received to perform the plurality of searches, wherein the request includes text. A search engine preference is retrieved, wherein the search engine preference specifies a plurality of search engines. An Internet browser is opened for each search engine in the plurality of search engines. A search is initiated in each Internet browser using the text.

Figure 4:
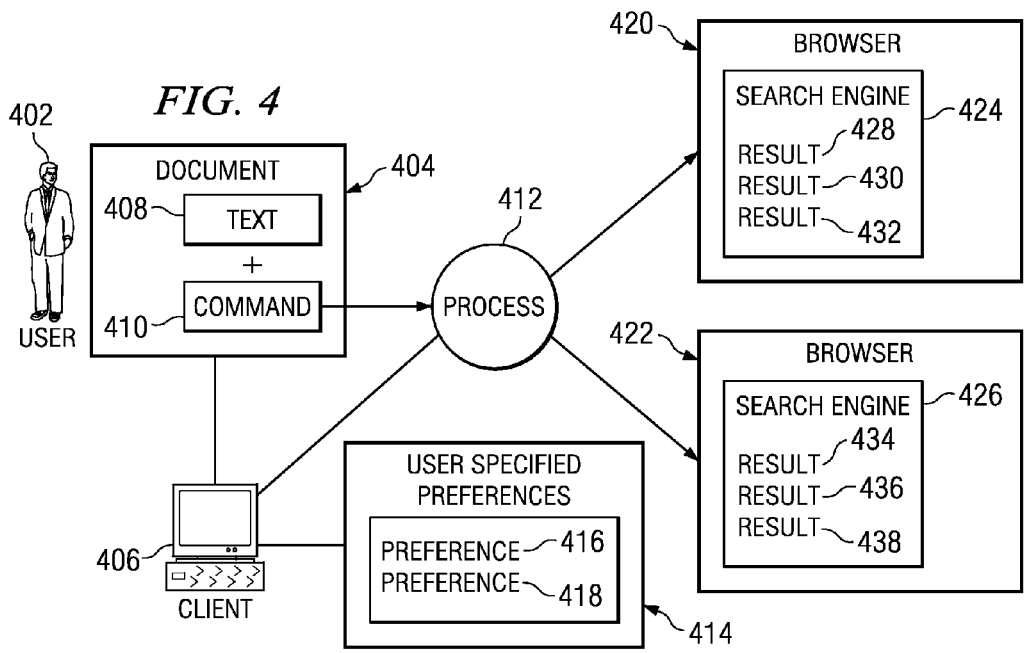
FIG. 4 is a block diagram illustrating searching in accordance with an illustrative embodiment.

FIG. 4 is a block diagram illustrating searching in accordance with an illustrative embodiment. In FIG. 4, user 402 views document 404 on client 406. Client 406 is a client, such as client 302 in FIG. 3. User 402 performs searches on text 408 in document 404 by selecting text 408 and issuing command 410. Command 410 notifies process 412 to perform a plurality of searches using text 408. This process does not require the user to copy text into multiple instances of a browser to perform searches with desired search engines. Process 412 can be implemented as an application plug-in, a modification to the browser application, or even a separate application working in conjunction with the browser.

Those versed in the art will appreciate that user 402 may issue command 410 in a variety of ways. For example, user 402 may create command 410 by pressing a key sequence such as "<ctrl>M", in which user 402 holds the control key, labeled "ctrl" on a keyboard used to input to client 406 and simultaneously presses the "M" key on the keyboard. Alternately, user 402 may assign the key sequence "<ctrl>M" to a function key on the keyboard.

Prior to performing the searches in these examples, user 402 creates a file on client 406, user specified preferences 414. In user specified preferences 414, user 402 specifies each search engine the user wishes to search for the selected text. In this example, user specified preferences 414 contain preference 416 and preference 418. However, those versed in the art will appreciate that user specified preferences 414 may contain a set of preferences, where a set is one or more preferences. Preferences 416 and 418 indicate the location of a preferred search engine for user 402. For example, preferences 416 and 418 may each be a uniform resource locator (URL) for a search engine.

Process 412 looks up user specified preferences 414 to determine which search engines the user wishes to search. Process 412 then opens one browser for each preference in user specified preferences 414. In this example, process 412 opens browser 420 for preference 416 and opens browser 422 for preference 418. Process 412 directs each open browser to the website for the search engine specified in user specified preferences 414. In this example, preference 416 specifies search engine 424, and preference 418 specifies search engine 426. Therefore, process 412 directs browser 420 to search engine 424 and directs browser 422 to search engine 426. Process 412 then provides text 408 to the search engine in each open browser and requests the search engine to perform a search using text 408.

For example, process 412 provides text 408 to search engine 424, resulting in result 428, result 430, and result 432. Similarly, process 412 provides text 408 to search engine 426, resulting in result 434, result 436, and result 438. Therefore, in the manner described above, user 402 is able to perform a plurality of searches and see the results from the plurality of searches on different search engines by highlighting text 408 and issuing command 410.

In one illustrative embodiment, a search can be performed on an internal network having multiple search engines. A page can then be opened for each search engine. However, in the above example, the page is a browser.

Figure 5:
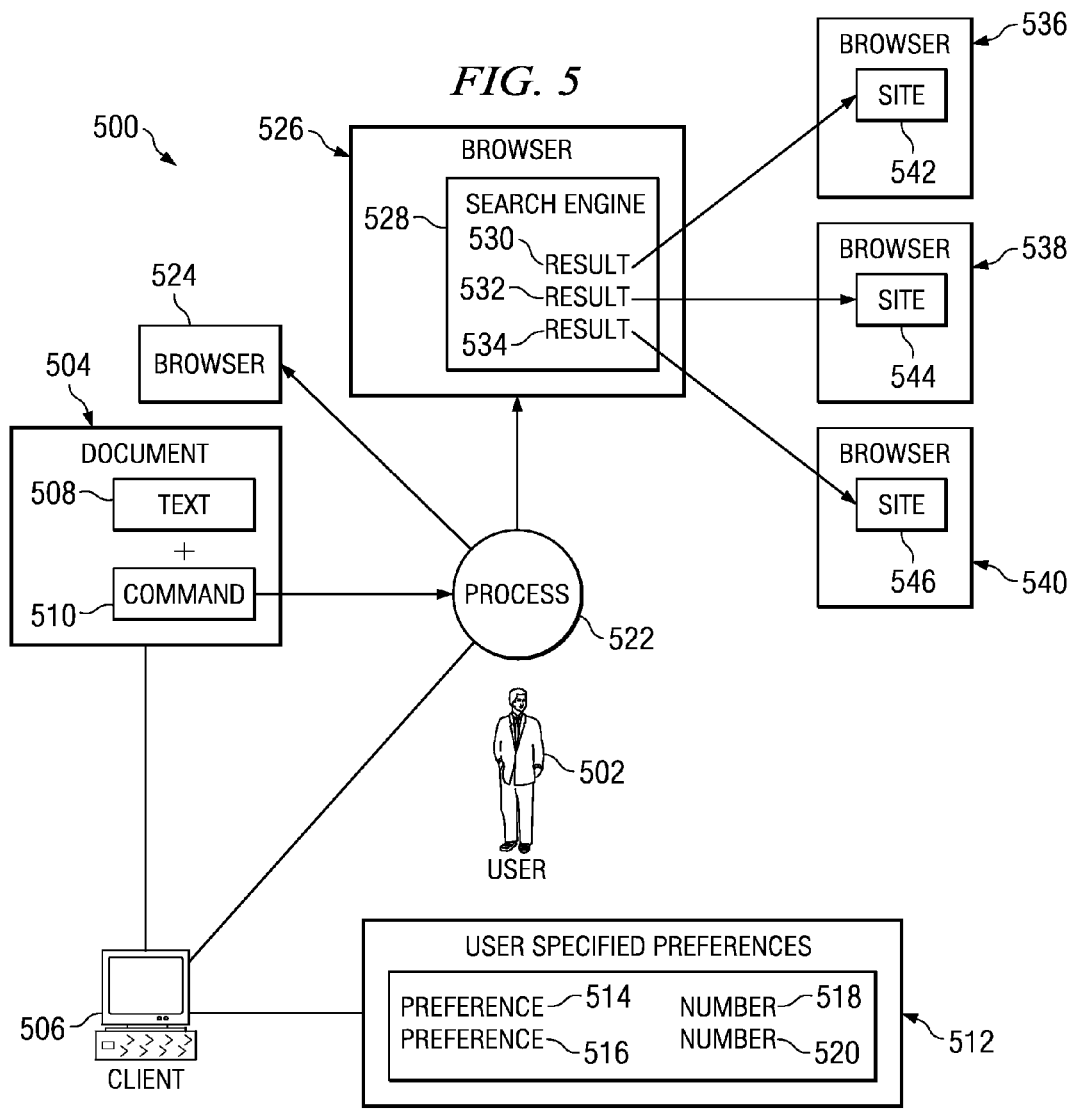
FIG. 5 is a block diagram illustrating opening a set of result websites in accordance with an illustrative embodiment.

FIG. 5 is a block diagram illustrating opening a set of result websites in accordance with an illustrative embodiment. In FIG. 5, user 502 views document 504 on client 506 and issues command 510. Client 506 is a client, such as client 406 in FIG. 4. Prior to issuing command 510, user 502 creates user specified preferences 512. In this example, user specified preferences 512 contain preference 514 and preference 516. Preferences 514 and 516 are preferences, such as preferences 416 and 418 in FIG. 4. User 502 also specifies number 518 corresponding to preference 514, and number 520 corresponding to preference 516. Numbers 518 and 520 specify the number of browser pages to be opened for the results of each search on text 508. In this example, two preferences, preferences 514 and 516 and two numbers, numbers 518 and 520 are present. However, those versed in the art will appreciate that user 502 may specify more than two preferences and two numbers.

When user 502 selects text 508 and issues command 510, process 522 looks in user specified preferences 512, and for each preference, opens a browser, directs the browser to the search engine specified in the preference, and requests the search engine to perform a search using text 508 as described in FIG. 4. In this example, process 522 opens browsers 524 and 526, directs browsers 524 and 526 to the search engines specified in preferences 514 and 516, respectively, and directs each search engine to perform a search using text 508. For the sake of clarity, only browser 526 is discussed further. However, it should be understood that process 522 performs similar actions on browser 524 as process 522 performs on browser 526, such as opening browser 526 and directing search engine 528 to perform a search.

Search engine 528 performs a search using text 508 and returns the results of the search. In this example, the results of search engine 528 searching on text 508 are result 530, result 532, and result 534. Of course, search engine 528 may return more than three results or fewer than three results. Three results are shown only for the purposes of illustration.

In addition to opening a browser for each preference in user specified preference 512, process 522 looks up the numbers corresponding to each preference. In this example, process 522 looks up numbers 518 and 520 corresponding to preferences 514 and 516, respectively. For each number associated with a preference in user specified preferences 512, process 522 selects a set of results comprising the first "n" results from search engine 528, where n is the numerical value of the number. Process 522 then opens "n" browsers and directs each browser to the web page corresponding to each result in the set of results.

In this example, assume the numerical value of number 518 is three. Process 522 selects the top three results as the set of results from search engine 528, results 530-534. Process 522 opens a browser for each result in the set of results. In this example, process 522 opens three browsers, browser 536, browser 538, and browser 540. Process 522 then directs each browser to the Internet location of each result in the set of results. In this example, process 522 directs browser 536 to site 542 corresponding to the location referenced by result 530. Process 522 directs browser 538 to site 544 corresponding to the location referenced by result 532. Process 522 directs browser 540 to site 546 corresponding to the location referenced by result 534.

Similarly, if number 520 has the numerical value five, process 522 selects the top five results from the search conducted in browser 524 as the set of results, opens five browsers, and directs each of the five browsers to the location referenced by each result in the set of results. Therefore, user 502, by selecting text 508 and issuing command 510, launches a plurality of searches and has a specified number of the top results opened in a browser for viewing. Each browser in browsers 524 and 526 and browsers 536 and 540 may be separate window, a tab in a window, or a combination of separate windows and tabs. In these examples a tab or tabbed page is a page displayed in a window for an instance of a browser. Typically, only a single tab is visible in a window with multiple tabs. A different page may be viewed by selecting a different tab. Each search may be opened in a separate tab on the same window. In other examples, each page may be opened in a separate window. In other examples, a combination of the two may be used or even other constructs for displaying pages.

Figure 6:
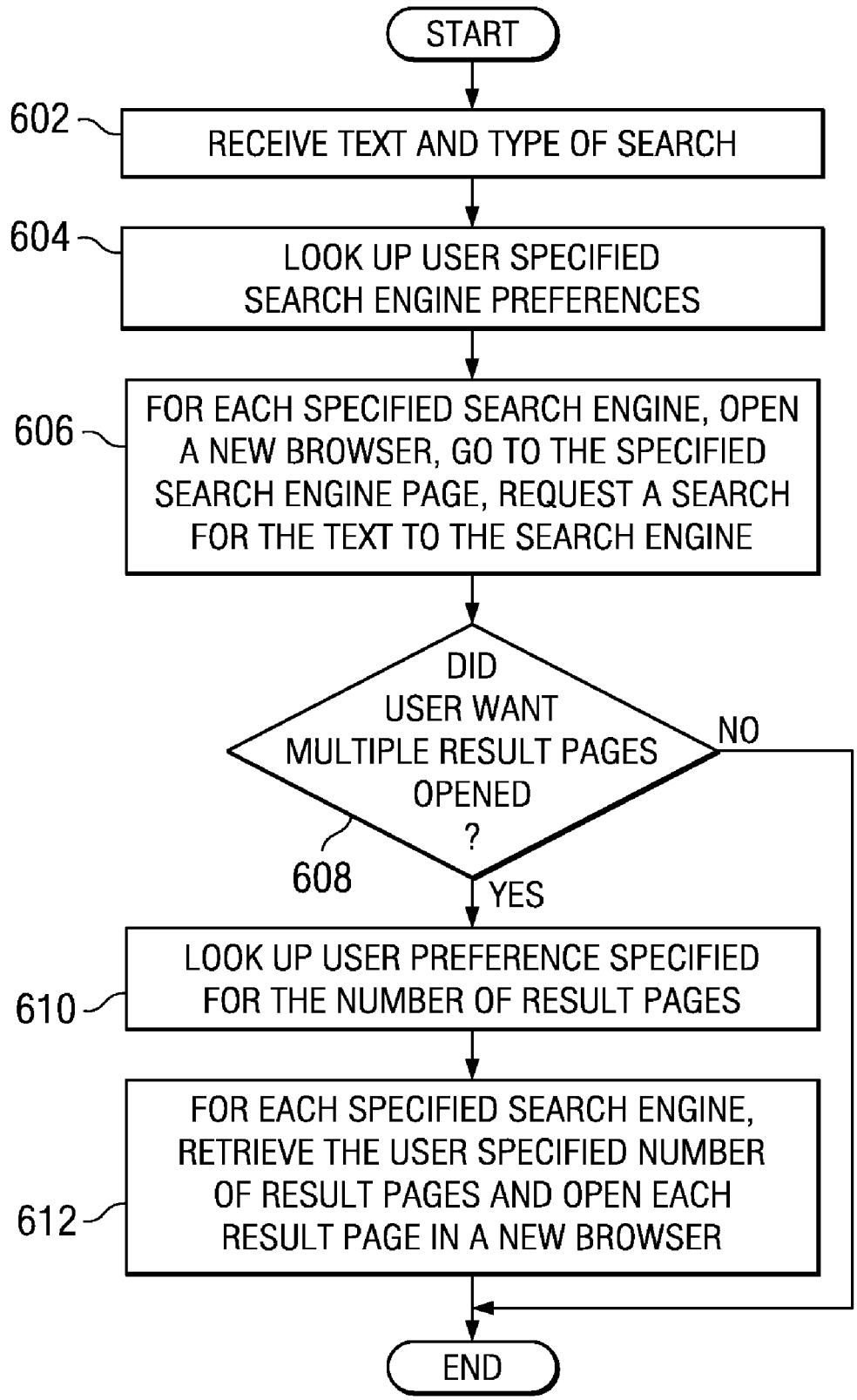
FIG. 6 is a flowchart for opening browser windows in accordance with an illustrative embodiment.

FIG. 6 is a flowchart for opening browser windows in accordance with an illustrative embodiment. The steps in FIG. 6 are executed by a process, such as process 412 in FIG. 4 or process 522 in FIG. 5. The process begins when text and a type of search to be performed are received (step 602). The type of search may be a search in which a plurality of searches is performed. Alternately, the type of search may be a search in which a plurality of searches is performed and a specified number of result pages are opened.

For example, a first command, such as "<ctrl>G", may cause the process to perform a search using a plurality of search engines as described in FIG. 4. A second command, such as "<ctrl>M", may cause the process to perform a plurality of searches and open a set of result websites for a specified number of search results for each search as described in FIG. 5.

Next, the process looks up the user specified search engine preferences (step 604). In an illustrative embodiment, search engine preferences can be stored as a uniform resource locator address. For each specified search engine, the process opens a new browser, directs the browser to the specified search engine website, and requests a search for the text (step 606). A determination is then made as to whether the user wants multiple result pages opened (step 608). If the user does not want multiple result pages opened, then the process ends. If the answer is "yes" and the user does want multiple user pages opened, then the user specified number of result pages are looked up for each search (step 610). For each specified search engine, the process retrieves the user specified number of result pages and opens the location of each result page in a new browser (step 612), and the process ends.

Thus, the illustrative embodiments described herein provide a computer implemented method, apparatus, and computer program product for performing a plurality of searches. A request is received to perform the plurality of searches, wherein the request includes text. A search engine preference is retrieved, wherein the search engine preference specifies a plurality of search engines. An Internet browser is opened for each search engine in the plurality of search engines. A search is initiated in each Internet browser using the text.

Normally, to initiate multiple searches for a selected text, a user opens a browser and navigates to each search engine the user prefers to use. The user then initiates a search in each browser using the selected text. The illustrative embodiments allow a user to initiate multiple searches for a selected text on a preferred set of search engines by selecting the text and issuing a command. Thus, the illustrative embodiments allow a user to initiate multiple searches for a selected text using less time and less effort.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing a plurality of searches, the computer implemented method comprising:

identifying a text to be searched, the text being located within a document;

receiving a command to perform the plurality of searches, wherein the command includes the text, and wherein the command is received external from a browser instance running one of a plurality of search engines, and wherein the command is issued within a graphical user interface for the document;

identifying a search engine preference in response to receiving the command, wherein the search engine preference specifies the plurality of search engines;

opening a page for each of the plurality of search engines to form a plurality of search pages; and initiating a search in each of the plurality of search pages for the plurality of search engines using the text to perform the plurality of searches with the plurality of search engines specified by the search engine preference;

receiving results from the plurality of search engines in response to submitting the text to the plurality of search engines to form received results;

responsive to receiving results from the plurality of search engines in response to submitting the text to the plurality of search engines to form received results, retrieving a user-specified number of pages to open for each of the plurality of search engines;

responsive to retrieving the user-specified number of pages to open for each of the plurality of search engines, opening a number of browser windows for a number of top search results returned by each of the plurality of search engines, wherein the number of browser windows for each of the plurality of search engines corresponds to the user-specified number of pages to open for a corresponding one of the plurality of search engines; and directing each of the number of browser windows for the number of top search results to the location referenced by a corresponding one of the number of top search results.

2. The computer implemented method of claim 1, further comprising:

displaying the received results on a display.

3. The computer implemented method of claim 2, further comprising:

retrieving web pages for a number of the received results from each of the plurality of search engines, wherein the number of the received results is greater than 1.

4. The computer implemented method of claim 3, further comprising:

displaying the web pages for the received results from each of the plurality of search engines, wherein each web page is displayed in a different one of the plurality of search pages.

5. The computer implemented method of claim 4, wherein the step of displaying the web pages for the received results further comprises displaying the web pages for only the user-specified number of pages to open.

6. The computer implemented method of claim 1, wherein the command comprises a user input selecting the text and issuing a command, wherein the command is a user-defined key sequence initiated from within a graphical user interface for the document.

7. A tangible computer readable medium having computer usable program code for performing a plurality of searches encoded thereon, the computer program product comprising:

computer usable program code for identifying a text to be searched, the text being located within a document;

computer usable code for receiving a command to perform the plurality of searches, wherein the command includes the text, and wherein the command is received external from a browser instance running one of a plurality of search engines, and wherein the command is issued within a graphical user interface for the document;

computer usable code for identifying a search engine preference in response to receiving the command, wherein the search engine preference specifies the plurality of search engines;

computer usable code for opening a page for each of the plurality of search engines to form a plurality of search pages; and computer usable code for initiating a search in each of the plurality of search pages for the plurality of search engines using the text to perform the plurality of searches with the plurality of search engines specified by the search engine preference;

computer usable code for receiving results from the plurality of search engines in response to submitting the text to the plurality of search engines to form received results;

computer usable code for responsive to receiving results from the plurality of search engines in response to submitting the text to the plurality of search engines to form received results, retrieving a user-specified number of pages to open for each of the plurality of search engines;

computer usable code for responsive to retrieving the user-specified number of pages to open for each of the plurality of search engines, opening a number of browser windows for a number of top search results returned by each of the plurality of search engines, wherein the number of browser windows for each of the plurality of search engines corresponds to the user-specified number of pages to open for a corresponding one of the plurality of search engines; and computer usable code for directing each of the number of browser windows for the number of top search results to the location referenced by a corresponding one of the number of top search results.

8. The tangible computer readable medium of claim 7, further comprising:

computer usable code for displaying the received results on a display.

9. The tangible computer readable medium of claim 8, further comprising:

computer usable code for retrieving web pages for a number of the received results from each of the plurality of search engines, wherein the number of the received results is greater than 1.

10. The tangible computer readable medium of claim 9, further comprising:

computer usable code for displaying the web pages for the received results further comprises displaying the web pages for only the user-specified number of search pages to open.

11. The tangible computer readable medium of claim 7, wherein the command comprises a user input selecting the text and issuing a command, wherein the command is a user-defined key sequence.

12. A data processing system for performing a plurality of searches, the data processing system comprising:

a bus;

a storage device connected to the bus, wherein the storage device contains computer usable code;

a communications unit connected to the bus; and a processing unit connected to the bus for executing the computer usable code, wherein the processing unit executes the computer usable code to identify a text to be searched, the text being located within a document; to receive a command to perform the plurality of searches, wherein the command includes the text, and wherein the command is received external from a browser instance running one of a plurality of search engines, and wherein the command is issued within a graphical user interface for the document; a search engine preference, wherein the search engine preference specifies the plurality of search engines, each of the plurality of search engines being opened in a separate browser within a plurality of browsers; and initiate a search in each of the plurality of browsers using the text, each browser within the plurality of browsers utilizing a different one of the plurality of search engines; to receive results from the plurality of search engines in response to submitting the text to the plurality of search engines to form received results; responsive to receiving results from the plurality of search engines in response to submitting the text to the plurality of search engines to form received results, to retrieve a user-specified number of pages to open for each of the plurality of search engines; responsive to retrieving the user-specified number of pages to open for each of the plurality of search engines, to open a number of browser windows for a number of top search results returned by each of the plurality of search engines, wherein the number of browser windows for each of the plurality of search engines corresponds to the user-specified number of pages to open for a corresponding one of the plurality of search engines; and to direct each of the number of browser windows for the number of top search results to the location referenced by a corresponding one of the number of top search results.

13. The data processing system of claim 12, wherein the processing unit further executes the computer usable code to display the received results.

14. The data processing system of claim 13, wherein the processing unit further executes the computer usable code to retrieve web pages for a number of the received results from each of the plurality of search engines, wherein the number of the received results is greater than 1.

15. The data processing system of claim 14, wherein the processing unit displays the web pages for the received results by further executing the computer usable code to display the web pages for only the user-specified number of browsers to open.

16. The data processing system of claim 14, wherein the processing unit further executes the computer usable code to display the web pages for the received results from each of the plurality of search engines, wherein each web page is displayed in a different one of the plurality of browsers.

17. The data processing system of claim 12, wherein the command comprises a user input selecting the text and issuing a command, wherein the command is a user-defined key sequence.

\* \* \* \* \*